United States Patent
Baese et al.

(10) Patent No.: US 7,068,721 B2
(45) Date of Patent: Jun. 27, 2006

(54) METHOD AND CONFIGURATION FOR CODING A DIGITIZED PICTURE, AND METHOD AND CONFIGURATION FOR DECODING A DIGITIZED PICTURE

(75) Inventors: Gero Baese, München (DE); Jürgen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 995 days.

(21) Appl. No.: 09/789,773

(22) Filed: Feb. 20, 2001

(65) Prior Publication Data
US 2002/0150161 A1    Oct. 17, 2002

Related U.S. Application Data

(63) Continuation of application No. PCT/DE99/01964, filed on Jul. 1, 1999.

(30) Foreign Application Priority Data
Aug. 18, 1998  (DE) ............................... 198 37 406

(51) Int. Cl.
H04N 7/12        (2006.01)
(52) U.S. Cl. .................................. 375/240.16; 382/236
(58) Field of Classification Search ........... 375/240.16, 375/240.14, 240.02; 386/25; 348/384.1, 348/416.1, 699; 382/236
See application file for complete search history.

(56) References Cited

U.S. PATENT DOCUMENTS 4,636,862 A    1/1987  Hatori et al.
5,150,209 A *  9/1992  Baker et al. ........... 375/240.02
5,155,594 A * 10/1992  Bernstein et al. ...... 375/240.14
5,351,083 A *  9/1994  Tsukagoshi ............. 348/384.1
5,523,850 A *  6/1996  Kanda et al. .................. 386/25
6,195,389 B1 * 2/2001  Rodriguez et al. ..... 375/240.16
6,526,096 B1 * 2/2003  Lainema et al. ....... 375/240.16

FOREIGN PATENT DOCUMENTS

| DE | 195 41 457 C1 | 7/1997 |
|----|---------------|--------|
| DE | 197 12 785 C1 | 7/1998 |
| EP | 0 414 016 A2 | 2/1991 |
| EP | 0 849 950 A2 | 6/1998 |

OTHER PUBLICATIONS

Published European Patent Application No. WO 92/05662 (Thomas et al.), dated Apr. 2, 1992.

* cited by examiner

Primary Examiner—Gims Philippe
(74) Attorney, Agent, or Firm—Laurence A. Greenberg; Werner H. Stemer; Ralph E. Locher

(57) ABSTRACT

Pixels in a digitized picture are grouped into picture blocks, which in turn are grouped at least in a first picture region and a second picture region. An overall motion vector is determined, through the use of which any shifting of the first picture region in comparison to the first picture region in a previous picture is described. The overall motion vector is allocated to all the picture blocks in the second picture region. A motion vector is determined for each of the picture blocks in the first picture region. The coding information of the picture blocks, the motion vectors and the overall motion vector are coded. A configuration for coding a digitized picture and a configuration for decoding a compressed picture are also provided.

16 Claims, 4 Drawing Sheets

METHOD AND CONFIGURATION FOR CODING A DIGITIZED PICTURE, AND METHOD AND CONFIGURATION FOR DECODING A DIGITIZED PICTURE

CROSS-REFERENCE TO RELATED APPLICATION

This application is a continuation of copending International Application No. PCT/DE99/01964, filed Jul. 1, 1999, which designated the United States.

BACKGROUND OF THE INVENTION

Field of the Invention

The invention relates to a method and a configuration for coding a digitized picture, and to a method and a configuration for decoding a digitized picture.

A block-based picture coding method is described in the ITU-T Draft Recommendation H.263, Video Coding for Low Bitrate Communication, May 1996. In this picture coding method, a picture to be coded has pixels to which coding information is allocated.

In the following text, the term coding information means luminance information (brightness information) or chrominance information (color information).

The pixels are grouped to form picture blocks, which normally contain 8×8 pixels or 16×16 pixels. The picture blocks are grouped to form macroblocks. A macroblock has four picture blocks with luminance information, and two picture blocks with chrominance information.

A so-called hybrid picture coding method is used for coding in the method described in the ITU-T Draft Recommendation H.263, Video Coding for Low Bitrate Communication, May 1996. This means a method in which, firstly, a discrete cosine transformation is carried out for the picture blocks and only spectral coefficients are transmitted while, secondly, attempts are made to avoid transmitting redundant information, contained in successive digitized pictures.

The term redundant information broadly defines coding information which has already been transmitted in a previous picture.

Movement information or shift information is transmitted in this context. This means that a determination is made of how a picture block has moved or shifted in its position within the picture from a previous picture to the picture to be coded. This movement or shift is determined and coded in the form of a vector, the motion vector, for each picture block to be coded. This method is referred to as motion estimation.

SUMMARY OF THE INVENTION

It is accordingly an object of the invention to provide a method and a configuration for coding and for decoding a digitized picture in which the required digital information for describing the digitized picture is less than that for known methods, without detracting significantly from the subjective quality impression of the reconstructed picture.

With the foregoing and other objects in view there is provided, in accordance with the invention, a method for coding a digitized picture, including the steps of:
providing a digitized picture having pixels and providing coding information allocated to the pixels;
grouping the pixels into picture blocks;
grouping the picture blocks to form at least a first picture region and a second picture region;
determining an overall motion vector, the overall motion vector describing a shift of the first picture region in comparison to the first picture region in a previous predecessor picture and/or the first picture region in a subsequent successor picture;
allocating the overall motion vector to at least some of the picture blocks in the second picture region;
determining respective motion vectors for the picture blocks in the first picture region and allocating the respective motion vectors to the picture blocks in the first picture region; and
coding the coding information of the picture blocks, the motion vectors and the overall motion vector.

In other words, in the method for coding a digitized picture with pixels to which coding information is allocated, the pixels are grouped into picture blocks. The picture blocks are grouped to form at least a first region and a second region. An overall motion vector is determined through the use of which any movement or shift of the first region in comparison to the first region in a previous predecessor picture and/or in comparison to the first region in a subsequent successor picture is described. The overall motion vector is allocated to at least some of the picture blocks in the second picture region. A motion vector is determined and is allocated to the picture block for each picture block in the first picture region. Coding information for the picture blocks is coded, as are the motion vectors and the overall motion vectors.

With the objects of the invention in view there is also provided, a method for decoding a compressed picture, which includes the steps of:
providing a compressed picture having pixels and providing coding information allocated to the pixels, the pixels being grouped into picture blocks, the picture blocks being grouped into at least a first picture region and a second picture region, the picture blocks, motion vectors of the picture blocks in the first picture region and an overall motion vector being coded, the overall motion vector being used to describe a shift of the first picture region in comparison to the first picture region in a previous predecessor picture and/or the first picture region in a subsequent successor picture; and
carrying out a decoding of the compressed picture by using the overall motion vector for decoding at least some of the picture blocks in the second picture region.

In other words, in the method for decoding a compressed picture with pixels to which coding information is allocated, the pixels are grouped into picture blocks. The picture blocks are grouped into at least a first picture region and a second picture region. The picture blocks, motion vectors for picture blocks in the first region and an overall motion vector are coded. The overall motion vector is used to describe any movement (shift) of the first picture region in comparison to the first picture region in a previous predecessor picture and/or in comparison to the first picture region in a subsequent successor picture. The decoding is carried out in such a manner that the overall motion vector is used for decoding at least some of the picture blocks in the second picture region.

According to another mode of the invention, the overall motion vector is determined from motion vectors of picture blocks in the first picture region.

According to yet another mode of the invention, the overall motion vector is determined by forming a mean value of motion vectors of picture blocks in the first picture region.

According to yet further mode of the invention, the overall motion vector is determined from motion vectors of given picture blocks in the first picture region, the given picture blocks being located substantially at an edge of the first picture region.

With the objects of the invention in view there is further provided a configuration for coding a digitized picture, including:

a processor configured to process a digitized picture having pixels and coding information allocated to the pixels;

the processor grouping the pixels into picture blocks;

the processor grouping the picture blocks to form at least a first picture region and a second picture region;

the processor determining an overall motion vector, the overall motion vector describing a shift of the first picture region in comparison to the first picture region in a previous predecessor picture and/or the first picture region in a subsequent successor picture;

the processor allocating the overall motion vector to at least some of the picture blocks in the second picture region;

the processor determining respective motion vectors for the picture blocks in the first picture region and allocating the respective motion vectors to the picture blocks in the first picture region; and the processor coding the coding information of the picture blocks, the motion vectors and the overall motion vector.

In other words, the configuration for coding a digitized picture with pixels to which coding information is allocated has a processor which is set up such that the following steps can be carried out:

the pixels are grouped into picture blocks, the picture blocks are grouped at least in a first picture region and a second picture region, an overall motion vector is determined, through the use of which any movement of the first picture region in comparison to the first picture region in a previous predecessor picture and/or in comparison to the first picture region in a subsequent successor picture is described, the overall motion vector is allocated to at least some of the picture blocks in the second picture region, a motion vector is determined and is allocated to the picture block for each picture block in the first picture region, and the coding information of the picture blocks is coded, as are the motion vectors and the overall motion vector.

With the objects of the invention in view there is also provided, a configuration for decoding a compressed picture, including:

a processor configured to process a compressed picture having pixels and coding information allocated to the pixels, the pixels being grouped into picture blocks, the picture blocks being grouped into at least a first picture region and a second picture region, the picture blocks, motion vectors of the picture blocks in the first picture region and an overall motion vector being coded, the overall motion vector being used to describe a shift of the first picture region in comparison to the first picture region in a previous predecessor picture and/or the first picture region in a subsequent successor picture; and the processor carrying out a decoding of the compressed picture by using the overall motion vector for decoding at least some of the picture blocks in the second picture region.

In other words, the configuration for decoding a compressed picture with pixels to which coding information is allocated has a processor which is set up such that the following steps can be carried out:

the pixels are grouped into picture blocks, the picture blocks are grouped into at least a first picture region and a second picture region, the picture blocks, motion vectors of picture blocks in the first picture region and an overall motion vector are coded, the overall motion vector is used to describe any movement (shift) of the first picture region in comparison to the first picture region in a previous predecessor picture and/or in comparison to the first picture region in a subsequent successor picture, the decoding is carried out in such a manner that the overall motion vector is used for decoding at least some of the picture blocks in the second picture region.

The invention results in a reduction in the required data rate for transmission of digitized pictures, or allows the overall available data rate to be utilized better, and this can be used to improve the picture quality.

According to another feature of the invention, the processor is configured to determine the overall motion vector from motion vectors of picture blocks in the first picture region.

According to a further feature of the invention, the processor is configured to determine the overall motion vector by forming a mean value of motion vectors of picture blocks in the first picture region.

According to another feature of the invention, the processor is configured to determine the overall motion vector from motion vectors of given picture blocks in the first picture region, the given picture blocks being located substantially at an edge of the first picture region.

It is advantageous to determine the overall motion vector from motion vectors of picture blocks in the first picture region, because the overall motion vector in this way more accurately describes the movement of the first picture region, which means that the quality of the decoded and reconstructed picture is improved.

A further improvement is obtained if the overall motion vector is determined from motion vectors from picture blocks in the first picture region which are located essentially at an edge of the first picture region.

Other features which are considered as characteristic for the invention are set forth in the appended claims.

Although the invention is illustrated and described herein as embodied in a method and configuration for coding a digitized picture, and a method and configuration for decoding a digitized picture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
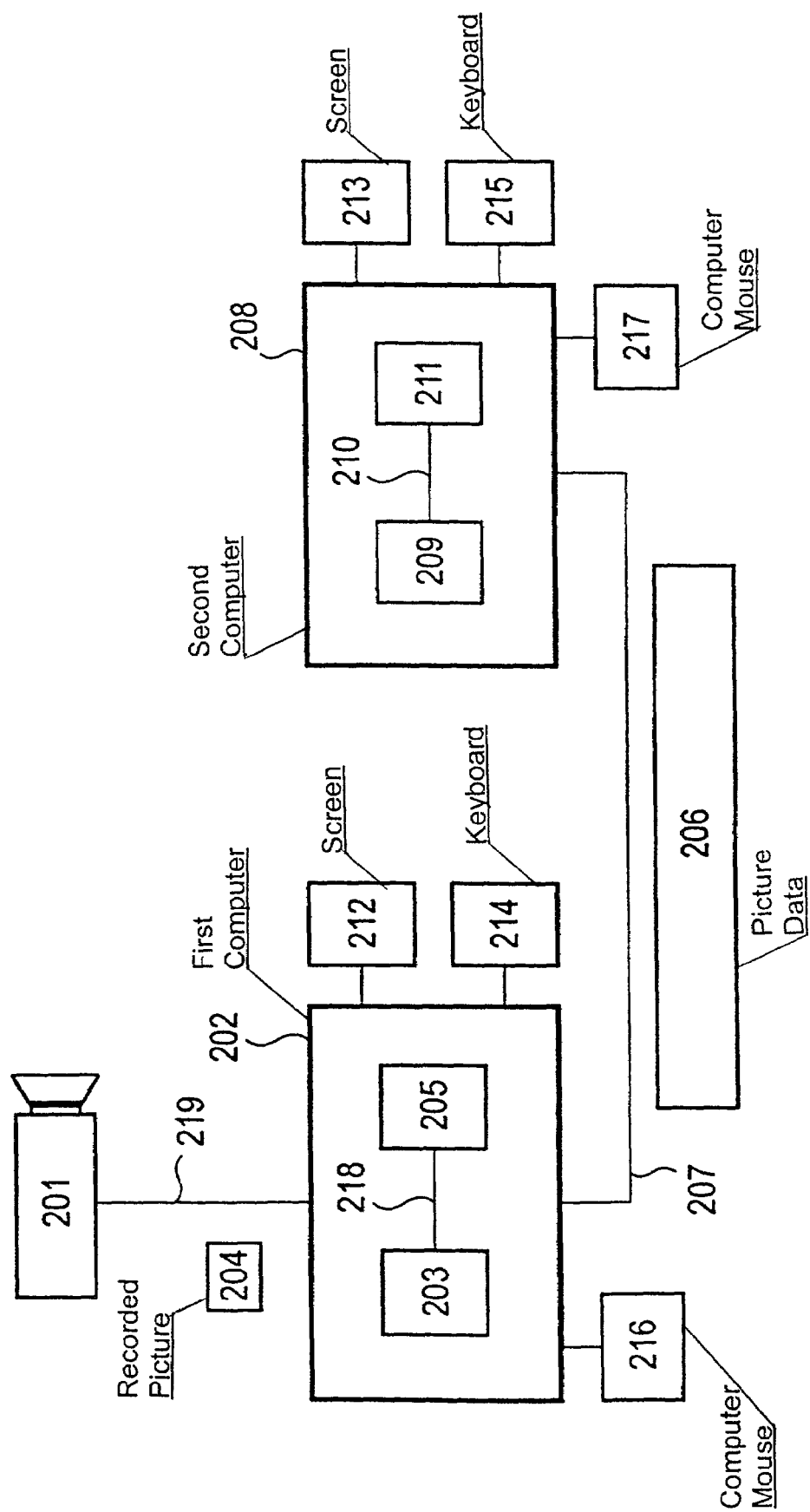
FIG. 2 is a block diagram of a configuration with two computers, a camera, and a screen, through the use of which the picture data are coded, transmitted, decoded and displayed.

Referring now to the figures of the drawings in detail and first, particularly, to FIG. 2 thereof, there is shown a configuration which includes two computers 202, 208 and a camera 201. FIG. 2 illustrates the picture coding, the transmission of picture data and the picture decoding.

A camera 201 is connected to a first computer 202 via a line 219. The camera 210 transmits recorded pictures 204 to the first computer 202. The first computer 202 has a first processor 203, which is connected via a bus 218 to a frame storage 205. A method for picture coding is carried out using the first processor 203 in the first computer 202. Picture data 206 coded in this way are transmitted from the first computer 202 via a communication link 207, preferably a line or a radio link, to a second computer 208. The second computer 208 contains a second processor 209, which is connected via a bus 210 to a frame storage 211. A method for picture decoding is carried out using the second processor 209.

Both the first computer 202 and the second computer 208 have a respective screen 212 and 213, on which the picture data 204 are displayed, with the display on the screen 212 of the first computer 202 normally being only for monitoring purposes. Input units, preferably a keyboard 214 or 215, respectively, and a computer mouse 216 or 217, respectively, are in each case provided to control both the first computer 202 and the second computer 208.

The picture data 204 which are transmitted from the camera 201 via the line 219 to the first computer 202 are data in the time domain, while the data 206 which are transmitted from the first computer 202 to the second computer 208 via the communication link 207 are picture data in the spectral domain. The decoded picture data are displayed on the screen 213.

Figure 3:
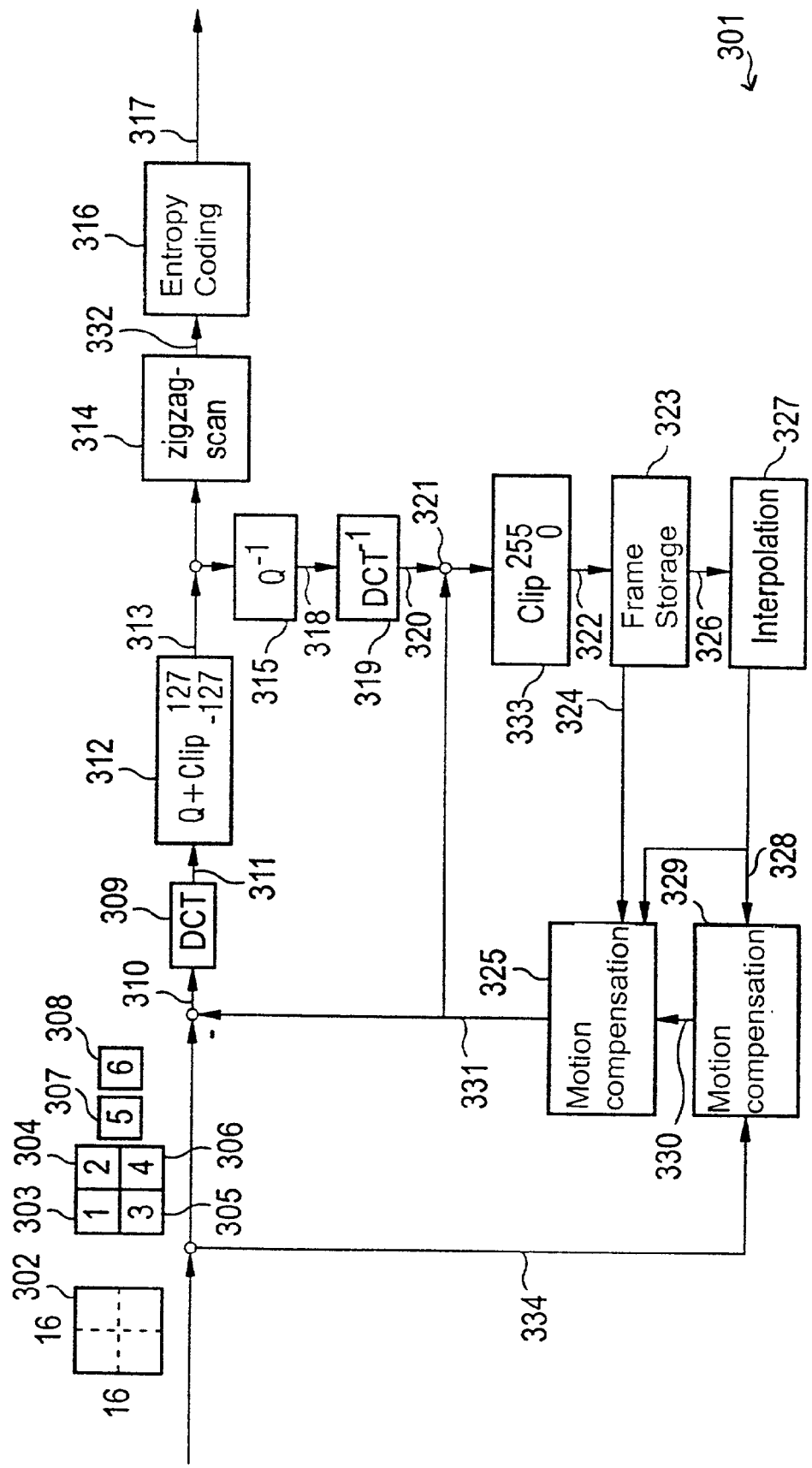
FIG. 3 is a block diagram of an apparatus for a block-based coding of a digitized picture.

FIG. 3 shows a schematic configuration for carrying out a block-based picture coding method in accordance with the H.263 Standard.

A video data stream to be coded and with successive digitized pictures is supplied to a picture coding unit 301. The digitized pictures are subdivided into macroblocks 302, with each macroblock containing 16×16 pixels. The macroblock 302 includes 4 picture blocks 303, 304, 305 and 306, with each picture block containing 8×8 pixels to which luminance values (brightness values) are allocated. Furthermore, each macroblock 302 includes two chrominance blocks 307 and 308 with chrominance values (color information, color saturation) allocated to the pixels.

The block for a picture contains a luminance value (=brightness), a first chrominance value (=hue) and a second chrominance value (=color saturation). In this case, the luminance value, first chrominance value and second chrominance value are referred to as color values.

The picture blocks are supplied to a transformation coding unit 309. In the case of difference-picture coding, values to be coded for picture blocks in previous pictures are removed (subtracted) from the picture blocks to be coded at that time, and only the difference-forming information 310 is supplied to the transformation coding unit (discrete cosine transformation DCT) 309. For this purpose, the current macroblock 302 is reported via a link 334 to a motion estimation unit 329. Spectral coefficients 311 are formed in the transformation coding unit 309 for the picture blocks or difference picture blocks to be coded, and are supplied to a quantization unit 312.

Quantized spectral coefficients 313 are supplied in a backward path both to a scanning unit 314 and to an inverse quantization unit 315. Using a scanning method, for example a "zigzag" scanning method, entropy coding is carried out on the scanned spectral coefficients 332, in an entropy coding unit 316 provided for this purpose. The entropy-coded spectral coefficients are transmitted to a decoder as coded picture data 317 via a channel, preferably a line or a radio link.

Inverse quantization of the quantized spectral coefficients 313 is carried out in the inverse quantization unit 315. Spectral coefficients 318 obtained in this way are supplied to an inverse transformation coding unit 319 (inverse discrete cosine transformation IDCT). Reconstructed coding values (and difference coding values) 320 are supplied in the difference picture mode to an adder 321. The adder 321 furthermore receives coding values for a picture block, which result from a previous picture once motion compensation has already been carried out. The adder 321 is used to form reconstructed picture blocks 322, which are stored in a frame storage 323. A clip unit 333 is provided between the adder 321 and the frame storage 323.

Chrominance values 324 for the reconstructed picture blocks 322 are supplied from the frame storage 323 to a motion compensation unit 325. For brightness values 326, interpolation is carried out in an interpolation unit 327 provided for this purpose. The interpolation is preferably used to quadruple the number of brightness values contained in the respective picture block. All the brightness values 328 are supplied both to the motion compensation unit 325 and to the motion estimation unit 329. The motion estimation unit 329 also receives the picture blocks of the respective macroblock (16×16 pixels) to be coded, via the link 334. The motion estimation is carried out in the motion estimation unit 329, taking account of the interpolated brightness values ("motion estimation on a half-pixel basis").

The result of the motion estimation is a motion vector 330 which describes the physical movement of the selected macroblock from the previous picture to the macroblock 302 to be coded.

Both brightness information and chrominance information related to the macroblock determined by the motion estimation unit 329 are shifted through the motion vector 330 and are subtracted from the coding values of the macroblock 302 (see the data path 331).

The motion estimation thus results in the motion vector 330 with two motion vector components, a first motion vector component $BV_x$ and a second motion vector component $BV_y$, along the first direction x and the second direction y:

$$BV = \begin{pmatrix} BV_x \\ BV_y \end{pmatrix} \quad (1)$$

The motion vector 330 is allocated to the picture block.

The picture coding unit shown in FIG. 3 thus supplies a motion vector 330 for all the picture blocks and macro picture blocks.

Figure 1:
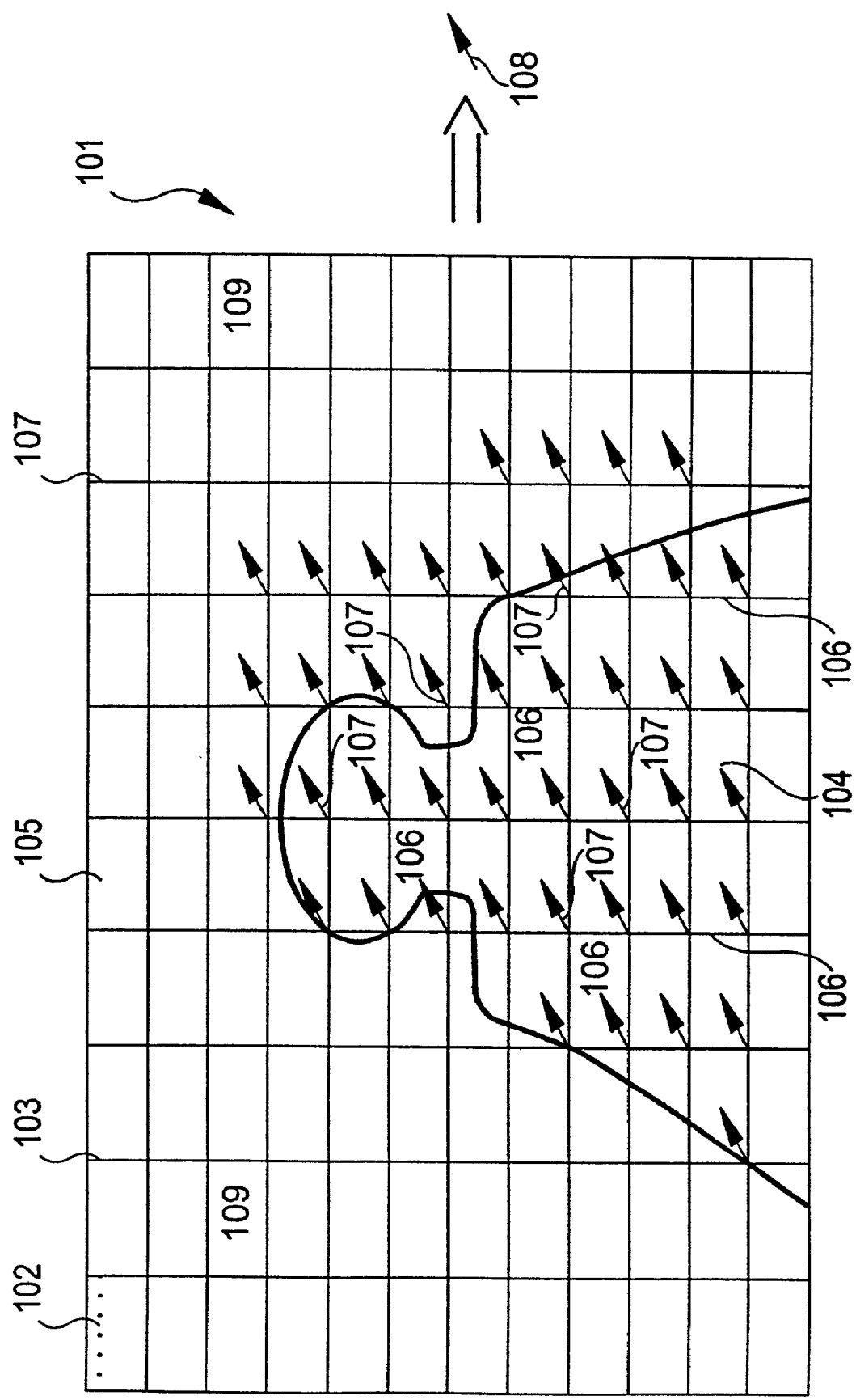
FIG. 1 is a sketch illustrating the principle on which the invention is based.

FIG. 1 shows the principle on which the invention is based.

A digitized picture 101 has pixels 102 which are grouped into picture blocks 103. The picture blocks are grouped into a first picture region 104 and a second picture region 105.

The first picture region 104 represents a highly mobile picture foreground. The second picture region 105 represents a picture background which varies only to a relatively minor extent between directly successive pictures.

Motion estimation is carried out for each picture block 106 in the first picture region 104, and a motion vector 107 is determined for each picture block 106 in the first picture region 104.

The motion estimation is carried out in such a way that the following error E is determined on the basis of a starting region whose size and shape are the same as those of the first picture block, in each case shifted through one pixel interval or through a fraction or a multiple of one pixel interval, preferably through half a pixel interval (half-pixel motion estimation), through which the starting region is in each case moved:

$$E = \sum_{i=1}^{n} \sum_{j=1}^{m} |x_{i,j} - y_{i,j}| \quad (2)$$

where
i, j are sequential indices,
n is the number of pixels in the first picture block along a first direction,
m is the number of pixels in the first picture block along a second direction,
$x_{i,j}$ is the coding information for the pixel at the position i, j within the first picture block,
$Y_{i,j}$ is the coding information for the pixel at the corresponding point in the previous picture, shifted through the corresponding motion vector.

The error E is calculated for each movement in the previous picture and the picture block whose error E has the lowest value for that movement (=motion vector) is selected as that being the most similar to the first picture block.

An overall motion vector 108 is determined from the motion vectors 107 which are allocated to the picture block 106 in the first picture region 104.

The motion vectors for picture blocks 106 in the first picture region 104 and which are essentially located at the edge of the first picture region 104 are advantageously taken into account for this purpose.

The overall motion vector 108 is formed by averaging the motion vectors considered.

The overall motion vector 108 describes the movement of the overall first picture region 104 between two successive pictures.

The overall motion vector 108 is allocated to all the picture blocks in the second picture region for coding and decoding, that is to say the overall motion vector 108 is used as a standard motion vector for the second picture region 105, that is to say the picture background.

As can be seen, the second picture region 105, that is to say the picture background, is thus moved as an entity. Errors occur only at the picture edges where, however, they are perceived only to a minor extent.

It is assumed that the picture blocks in the second picture region have already been coded with adequate quality.

For this purpose, a quality measure is determined for each new coded picture block by comparison with the previous picture block, once again by forming the sum of absolute differences via the coding information for the individual pixels.

The method described above is carried out in the motion estimation unit 329.

Thus, only the motion vectors 107 in the picture blocks in the first picture region together with the overall motion vector 108 are coded and transmitted.

Figure 4:
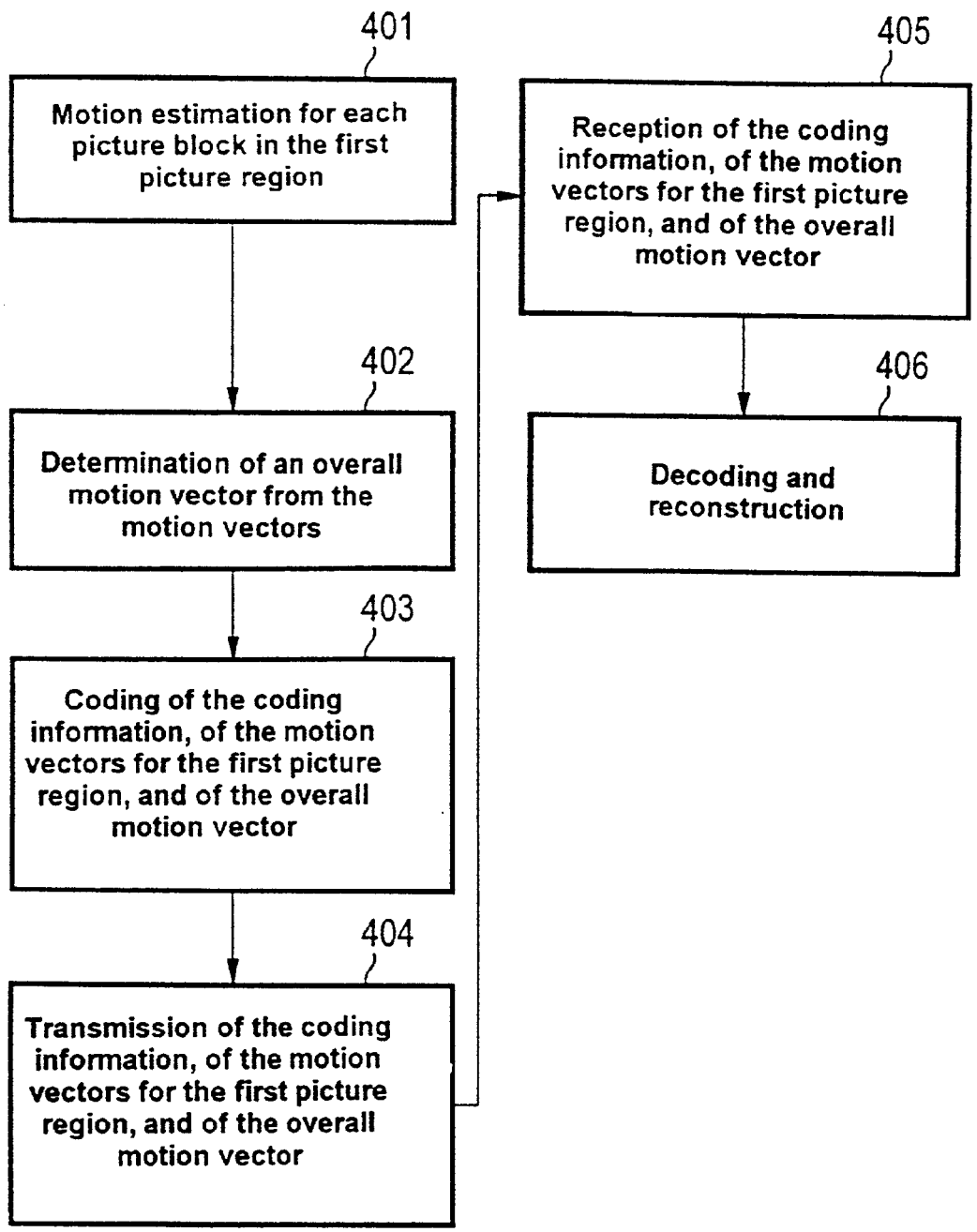
FIG. 4 is a flowchart illustrating the method steps for coding, transmission and decoding of a digitized picture.

FIG. 4 shows a flowchart illustrating the individual method steps in the exemplary embodiment once again.

In a first step (step 401), motion estimation is carried out for each picture block in the first picture region, as a result of which a motion vector is determined for each picture block in the first picture region.

In a second step, an overall motion vector is determined from at least some of the motion vectors for the picture blocks in the first picture region (step 402).

The coding information, the motion vectors 107 for the picture blocks 106 in the first picture region 104, and the overall motion vector 108 are coded (step 403).

The coding information, the overall motion vector and the motion vectors for the picture blocks in the first picture region are transmitted in a further step (step 404).

After reception of the coded picture data (step 405), the coding information, the motion vectors 107 for the picture blocks 106 in the first picture region 104 and the overall motion vector 108 are decoded, and the picture 101 is reconstructed (step 406).

The overall motion vector 108 is used for all the picture blocks 109 in the second picture region 105 for reconstruction of the picture 101.

This thus avoids the coding, transmission and/or storage of motion vectors for picture blocks in the second picture region, and this leads to a considerable saving in the required data rate.

Alternatives to the exemplary embodiment described above are explained below:

The nature of the motion estimation process is not relevant to the invention, that is to say any desired method may be used for motion estimation.

The formation of the overall motion vector from the motion vectors in the first picture region is not essential to the invention either, that is to say averaging, weighted averaging or else only a motion vector which is regarded as being representative of all the motion vectors for the picture blocks in the first picture region can be used as the overall motion vector.

Picture information which is lacking at the picture edges as a result of the method can be re-formed during the transmission of subsequent pictures with relatively little motion, or else can be read from a background storage, in which the corresponding picture information from previous pictures is stored.

Furthermore, the invention is not limited to two picture regions. There may be a number of picture regions to which picture blocks are allocated, for example a number of independent objects which form a moving foreground. In this case, one picture object is selected for which an overall motion vector is then determined. The picture region which describes the background is then shifted with this overall motion vector.

According to the exemplary embodiment, the error E is formed from the sum of the absolute differences. However, the error E can also be formed from the sum of quadratic differences or from the sum of differences of higher powers. This applies in a corresponding manner to the formation of the quality measure.

We claim:

1. A method for coding a digitized picture, the method which comprises:
   providing a digitized picture having pixels and providing coding information allocated to the pixels;
   grouping the pixels into picture blocks;
   grouping the picture blocks to form at least a first picture region and a second picture region;
   determining an overall motion vector, the overall motion vector describing a shift of the first picture region in comparison to at least one of the first picture region in a previous predecessor picture and the first picture region in a subsequent successor picture;
   allocating the overall motion vector to at least some of the picture blocks in the second picture region;
   determining respective motion vectors for the picture blocks in the first picture region and allocating the respective motion vectors to the picture blocks in the first picture region; and
   coding the coding information of the picture blocks, the motion vectors and the overall motion vector.

2. The method according to claim 1, which comprises determining the overall motion vector from motion vectors of picture blocks in the first picture region.

3. The method according to claim 1, which comprises determining the overall motion vector by forming a mean value of motion vectors of picture blocks in the first picture region.

4. The method according to claim 1, which comprises determining the overall motion vector from motion vectors of given picture blocks in the first picture region, the given picture blocks being located substantially at an edge of the first picture region.

5. A method for decoding a compressed picture, the method which comprises:
   providing a compressed picture having pixels and providing coding information allocated to the pixels, the pixels being grouped into picture blocks, the picture blocks being grouped into at least a first picture region and a second picture region, the picture blocks, motion vectors of the picture blocks in the first picture region and an overall motion vector being coded, the overall motion vector being used to describe a shift of the first picture region in comparison to the first picture region in at least one of a previous predecessor picture and a subsequent successor picture; and
   carrying out a decoding of the compressed picture by using the overall motion vector for decoding at least some of the picture blocks in the second picture region.

6. The method according to claim 5, which comprises determining the overall motion vector from motion vectors of picture blocks in the first picture region.

7. The method according to claim 5, which comprises determining the overall motion vector by forming a mean value of motion vectors of picture blocks in the first picture region.

8. The method according to claim 5, which comprises determining the overall motion vector from motion vectors of given picture blocks in the first picture region, the given picture blocks being located substantially at an edge of the first picture region.

9. A configuration for coding a digitized picture, comprising:
   a processor configured to process a digitized picture having pixels and coding information allocated to the pixels;
   said processor grouping the pixels into picture blocks;
   said processor grouping the picture blocks to form at least a first picture region and a second picture region;
   said processor determining an overall motion vector, the overall motion vector describing a shift of the first picture region in comparison to at least one of the first picture region in a previous predecessor picture and the first picture region in a subsequent successor picture;
   said processor allocating the overall motion vector to at least some of the picture blocks in the second picture region;
   said processor determining respective motion vectors for the picture blocks in the first picture region and allocating the respective motion vectors to the picture blocks in the first picture region; and
   said processor coding the coding information of the picture blocks, the motion vectors and the overall motion vector.

10. The configuration according to claim 9, wherein said processor determines the overall motion vector from motion vectors of picture blocks in the first picture region.

11. The configuration according to claim 9, wherein said processor determines the overall motion vector by forming a mean value of motion vectors of picture blocks in the first picture region.

12. The configuration according to claim 9, wherein said processor determines the overall motion vector from motion vectors of given picture blocks in the first picture region, the given picture blocks being located substantially at an edge of the first picture region.

13. A configuration for decoding a compressed picture, comprising:
   a processor configured to process a compressed picture having pixels and coding information allocated to the pixels, the pixels being grouped into picture blocks, the picture blocks being grouped into at least a first picture region and a second picture region, the picture blocks, motion vectors of the picture blocks in the first picture region and an overall motion vector being coded, the overall motion vector being used to describe a shift of the first picture region in comparison to the first picture region in at least one of a previous predecessor picture and a subsequent successor picture; and
   said processor carrying out a decoding of the compressed picture by using the overall motion vector for decoding at least some of the picture blocks in the second picture region.

14. The configuration according to claim 13, wherein said processor is configured such that the overall motion vector is determined from motion vectors of picture blocks in the first picture region.

15. The configuration according to claim 13, wherein said processor is configured such that the overall motion vector is determined by forming a mean value of motion vectors of picture blocks in the first picture region.

16. The configuration according to claim 13, wherein said processor is configured such that the overall motion vector is determined from motion vectors of given picture blocks in the first picture region, the given picture blocks being located substantially at an edge of the first picture region.

* * * * *